No. 793,807. PATENTED JULY 4, 1905.
G. A. SEAMAN.
PIPE COUPLING.
APPLICATION FILED AUG. 13, 1904.
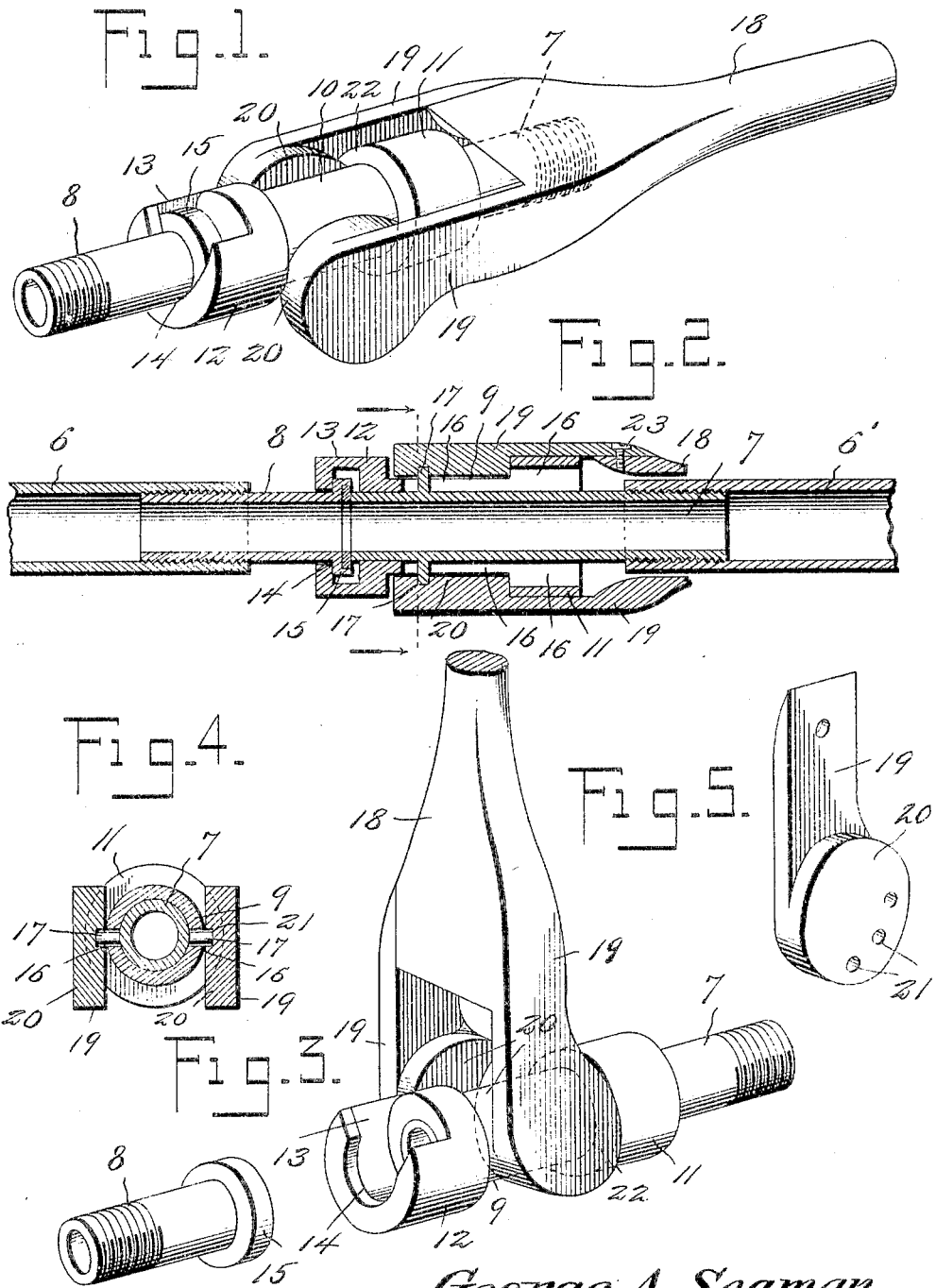

No. 793,807.

Patented July 4, 1905.

UNITED STATES PATENT OFFICE.

GEORGE A. SEAMAN, OF INDEPENDENCE, COLORADO.

PIPE-COUPLING.

SPECIFICATION forming part of Letters Patent No. 793,807, dated July 4, 1905.

Application filed August 13, 1904. Serial No. 220,672.

*To all whom it may concern:*

Be it known that I, GEORGE A. SEAMAN, a citizen of the United States, residing at Independence, in the county of Teller and State of Colorado, have invented a new and useful Pipe-Coupling, of which the following is a specification.

This invention relates to an improved hose-coupling, and has for its object to provide a simple, inexpensive, and efficient device of this character by means of which two or more sections of hose may be conveniently and expeditiously coupled.

A further object of the invention is to provide a coupling in which the use of screw-threads, locking-lugs, and similar fastening devices are entirely dispensed with, the adjacent sections of hose or pipe being quickly connected or disconnected by the movement of a cam-lever.

A still further object is to provide means for varying the throw or longitudinal movement of the movable coupling member so as to increase or diminish the clamping action on the stationary member.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, forming a part of this specification, Figure 1 is a perspective view of my improved hose or pipe coupling. Fig. 2 is a horizontal section of the same. Fig. 3 is a perspective view showing the coupling detached. Fig. 4 is a transverse sectional view. Fig. 5 is a detail perspective view of the removable cam member.

Similar numerals of reference indicate corresponding parts in all the figures of the drawings.

The numerals 6 and 6' designate hose or pipe sections of the ordinary form and construction employed for conveying water, steam, air, and other fluids under pressure to distant points. Secured in any suitable manner to the end of the section 6' is a coupling-tube 7, which constitutes the movable clamping member, and secured to the end of the section 6 is a similar tube 8, which forms the stationary clamping member of the coupling. The tube 7 is mounted for longitudinal movement in a coupling sleeve or collar 9, said collar being provided with a peripheral recess 10, defining oppositely-disposed annular flanges 11 and 12. The flange 12 is cut away, as indicated at 13, and provided with an annular recess or socket 14, which forms a seat for the coupling-head 15 of the tube or stationary member 8. The side walls of the sleeve or collar 9 are provided with oppositely-disposed grooves or channels 16, adapted to receive guiding pins or lugs 17, secured to or formed integral with the tube or movable member 7. The member 7 is adjusted longitudinally within the sleeve or collar by means of a hand-operated lever 18, the end of which is bifurcated to form a pair of parallel arms 19, provided with terminal cams 20. The cams 20 fit within the peripheral recess of the coupling sleeve or collar and have their inner faces provided with a series of recesses or pockets 21, adapted to receive the pins or lugs or the movable member 7, so that when the operating-lever is swung outwardly to the position shown in Fig. 3 the terminal cams will engage the shoulders 22 and retract the tube or movable member 7, and thereby release the adjacent section of pipe or hose. One of the parallel arms 19 is preferably detachably secured to the operating-lever, as by a bolt 23, so as to permit said arm to be removed when adjusting the cams to vary the throw or longitudinal movement of the movable clamping member.

To connect two sections of pipe or tube, the operating-lever is swung outwardly, as shown in Fig. 3, thereby drawing the end of the movable member within the coupling sleeve or collar. The coupling-head 15 of the stationary section 8 is then seated in the recess or socket 14 and the lever 18 depressed or thrown down on the section 6', thereby forcing the movable member in engagement with the head 15 and the latter against the wall of the recess 14, as clearly shown in Fig. 1 of the drawings.

The throw or longitudinal movement of the movable clamping member may be varied to accommodate coupling-heads of different thicknesses by detaching the removable arm of the operating-lever and introducing the pins or lugs in the corresponding pockets of the terminal cams, as will be readily understood.

The coupling is provided with the usual gaskets or washers to form an air or water tight joint between the several sections, and, if desired, the parallel arms of the operating-lever may be made of spring metal, so as to yield slightly and permit the adjustment of the cams without the necessity of detaching the arm of said lever.

From the foregoing it will be seen that the improved coupling permits of a quick attachment or detachment of pipe-sections and is particularly adapted for use on fire-hose and the like.

Having thus described the invention, what is claimed is—

1. A pipe-coupling comprising stationary and movable clamping members, a sleeve or collar surrounding the movable member and provided with an annular recess defining oppositely-disposed shoulders, the walls of said recess being provided with longitudinal slots, lugs or pins projecting laterally from the movable member and extending through said slots, and cams seated in said annular recess and engaging the pins, said cams being adapted to engage the shoulders for actuating the movable clamping member.

2. A pipe-coupling comprising stationary and movable clamping members, a sleeve or collar surrounding the movable member and provided with oppositely-disposed slots, a cam having its inner face provided with a series of pockets, and pins or lugs carried by the movable member and extending through said longitudinal slots for engagement with the pockets to thereby vary the throw of said movable member.

3. A pipe-coupling comprising stationary and movable clamping members, a sleeve or collar surrounding the movable member and provided with a terminal socket forming a seat for both members, said sleeve being provided with oppositely-disposed longitudinal slots, a cam having its inner face provided with a marginal row of pockets, and pins or lugs carried by the movable member and extending through said longitudinal slots for engagement with the pockets to thereby vary the throw of said movable member.

4. A pipe-coupling comprising stationary and movable clamping members, a sleeve or collar surrounding the movable member and provided with an annular recess and oppositely-disposed longitudinal slots, an operating-lever provided with spaced terminal cams one of which is detachably secured to the lever, and pins or lugs carried by the movable member and extending through said slots for engagement with the cams, there being a series of marginal pockets formed in the inner faces of the cams for varying the throw of the movable member.

In testimony that I claim the foregoing as my own I have hereto affixed my signature in the presence of two witnesses.

GEORGE A. SEAMAN.

Witnesses:
ALBERT BENORE,
HIRAM O. TURNER.